(12) United States Patent
Dulaney et al.

(10) Patent No.: US 6,288,358 B1
(45) Date of Patent: Sep. 11, 2001

(54) MOBILE LASER PEENING SYSTEM

(75) Inventors: Jeffrey L. Dulaney, Dublin; Steven M. Toller, Grove City; Allan H. Clauer, Worthington, all of OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/211,553

(22) Filed: Dec. 15, 1998

(51) Int. Cl.[7] .................................................. B23K 26/00
(52) U.S. Cl. ..................................... 219/121.6; 219/121.85
(58) Field of Search ........................... 219/121.6, 121.85, 219/121.68, 121.69, 121.84; 148/525, 565; 427/554, 596

(56) References Cited

U.S. PATENT DOCUMENTS

| 4,305,640 | * | 12/1981 | Cullis et al. ................... 219/121.6 |
| 4,313,093 | * | 1/1982 | Suenaga et al. ................ 219/121.85 |
| 5,151,134 | * | 9/1992 | Boquillon et al. ............... 219/121.85 |
| 5,531,570 | * | 7/1996 | Mannava et al. ................ 219/121.85 |
| 5,571,575 | * | 11/1996 | Takayanagi .......................... 427/554 |
| 5,741,559 | * | 4/1998 | Dulaney ................................ 427/554 |
| 5,790,620 | * | 8/1998 | Okazaki et al. ....................... 148/525 |
| 5,863,017 | * | 1/1999 | Larson et al. . |

FOREIGN PATENT DOCUMENTS 7-246483   9/1995   (JP) .

* cited by examiner

Primary Examiner—Geoffrey S. Evans
(74) Attorney, Agent, or Firm—Randall J. Knuth (57) ABSTRACT

A remote laser shock processing system for improving the properties of a solid workpiece by providing shock waves therein. The system includes a remote output end and a laser beam delivery arrangement for directing a beam of coherent energy to a specific location along a workpiece. In addition, a method of utilizing the remote laser shock processing system is included.

27 Claims, 4 Drawing Sheets

MOBILE LASER PEENING SYSTEM

BACKGROUND OF THE INVENTION

1. Field of the invention.

The present invention relates to the use of coherent energy pulses to improve the properties of a solid material by providing shock waves therein and in particular methods and apparatus for remotely directing the pulse of coherent energy.

2. Description of the related art.

Laser shock processing involves directing a pulse of coherent radiation to a piece of solid material to produce shock waves therein. The produced shock wave causes compressive residual stresses to form within the solid material. These compressive residual stresses improve the fatigue properties of the solid material.

Currently, laser shock processing utilizes two overlays: a transparent overlay (usually water) and an opaque overlay (usually an oil based paint or black plastic tape). During processing, a laser beam is directed to pass through the water overlay and is absorbed by the black paint, causing a rapid vaporization of the paint surface (plasma creation) and a generation of a high-amplitude shock wave. The shock wave cold works the surface of the part and creates compressive residual stresses, which provide an increase in fatigue properties of the workpiece. A workpiece is typically processed by processing a matrix of overlapping spots that cover the fatigue critical zone of the part.

Currently, laser shock processing apparatus are mounted in a fixed or stationary location. The laser and the laser beam pathway are held in a fixed position directed toward a workpiece located in an immobile or stationary processing station. In order to laser shock process a workpiece, the workpiece must be placed within the stationary processing station and aligned within the laser beam pathway. As a result of the workpiece having to be located within the processing station, the size or dimension of the workpiece to be processed is thereby limited; the workpiece must fit within the finite space of the stationary processing station.

SUMMARY OF THE INVENTION

The present invention provides an apparatus for laser shock peening large or difficult to move workpieces, such as aircraft structures, stationary machines, building structures, and other large, similar workpieces. The apparatus includes a laser system and a laser beam delivery means for delivering a laser beam to a moveable, remote, and relocatable remote output end. The remote output end is first aligned to the workpiece to be laser peened. Then, a pulse of laser energy is transmitted from the laser system, through the laser beam delivery means, through the remote output end, and onto the large workpiece. With the present invention, the part-size constraint imposed by typical laser peening cells is eliminated. The laser beam is brought to the area of the workpiece, rather than manipulating the workpiece in the laser beam.

The invention in one form thereof, is an apparatus for improving the properties of a workpiece by providing shock waves by remote processing therein. The apparatus includes a remote output end and a laser operatively associated with the remote output end. There is means for aligning the remote output end. The laser beam delivery means delivers a beam of coherent energy from the laser to the remote output end.

In a further embodiment, the apparatus includes a power unit and the apparatus is mobile. In various alternate embodiments, the laser beam delivery means includes fiber optics, a light pipe, an articulated arm with pivotable mirrors, or a laser beam delivery service integrated within a building, factory, or structure. Alternate embodiments include a combination of the aforementioned laser delivery systems. The apparatus may also include an overlay system for applying an opaque and transparent overlay to the workpiece to be laser shock processed.

The invention in yet another form thereof is a method of improving the properties of a workpiece by providing shock waves therein. The method includes applying an overlay to the workpiece. A remote output end is aligned to the overlay portion of the workpiece. A pulse of coherent energy is directed to the overlay portion of the workpiece. In a further embodiment, the step of directing a pulse of coherent energy to the overlay portion of the workpiece occurs through various means such as a fiber optic bundle, a light pipe, an articulated arm comprising a plurality of pivotable mirrors, a laser beam delivery service integrated within a structure, and/or a combination thereof.

An advantage of the present invention is that large workpieces, which can not fit into a conventional laser shock processing station, can now be laser shock peened. For example, air craft structures, such as large wing sections and the fuselage, ships, and large earth moving equipment may now be laser shock processed. Moreover, these large structures may be laser shock processed in their assembled position or condition. The present invention's remote output end can be aligned to a desired location on the workpiece. In one embodiment of the invention, the laser system is mobile, allowing the laser system to be moved near the workpiece; thereby reducing the size and complexity of the laser beam delivery means. The workpiece no longer has to be moved to and manipulated within a stationary processing station.

A laser beam delivery means delivers a pulse of coherent energy from a laser to the remote output end which allows the remote output end to be mobile and relocatable along the workpiece. In other words, the workpiece stays stationary while the remote output end moves as required for laser shock processing. In addition, a laser beam delivery system may be incorporated within a building layout to deliver a pulse of coherent energy to the remote output end. As a result, processing of large material workpieces is achieved.

An additional advantage of the present invention is the ability to move the laser processing apparatus from place to place. One embodiment of the present invention is a self-contained or mobile laser shock processing apparatus. The entire apparatus may be moved from one location to another in order to process a workpiece, as opposed to the current practice of sending the material to be laser peened to an offsite processor. For example, the mobile laser peening apparatus may be transported to a manufacturer's assembly factory where the apparatus could be used to laser shock process a workpiece. Therefore, a workpiece can be assembled and processed within the manufacturer's own factory. As a result, there may be a decrease in manufacturing costs associated with the increase in convenience of being able to laser process a workpiece within a manufacturer's own factory.

Another advantage of the present invention is an alignment device, such as a bore-sighting device, with a cross hair or other guidelines for properly aiming the pulse of coherent energy to a specific location on the workpiece. In one embodiment, the remote output end contains a window or opening whereby an operator may view the location of where the beam of coherent energy will be placed. As a result, the operator is able to precisely direct the beam of coherent energy to a specific location along the workpiece.

In an additional embodiment, a camera is used to remotely align or guide the remote output end to a specific location along the workpiece. An operator may remotely control the remote output end by viewing the processing location on the workpiece via the camera. If the remote output end is located on the end of a robot arm, an operator will be able to process very large or cumbersome workpieces, for example, an airplane fuselage or large wing section, with ease. Consequently, once unprocessable workpieces may be simply and easily laser shock processed.

Another advantage of the present invention is that the remote output end may include a light safe seal or shield. This seal or shield may be adaptable to fit the varying geometries of the peened surface. As a result, the seal will prevent potentially dangerous pulses of coherent energy from being emitted from the remote output end into the ambient environment. Therefore, the seal helps protect both workers and equipment within the vicinity of the laser shock processing site from being injured from the laser shock processing laser pulse.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The improvements in fatigue life produced by laser shock processing are the result of residual compressive stresses developed in an irradiated surface retarding fatigue crack initiation and/or slowing the crack propagation rate. A crack front is the leading edge of a crack as it propagates through a solid material. Changes in the shape of a crack front and slowing of the crack growth rate when the crack front encounters the laser shock zone in a laser shock processing condition have been shown. Laser shock processing is an effective method of increasing fatigue life in metals by treating fatigue critical regions. The effect of tensile residual stresses surrounding the laser shocked region would have on crack initiation has previously been described in "Shock Waves in High Strained Rate Phenomenon in Metals" by A. H. Clauer, J. H. Holbrook, and B. P. Fairand, ed. by M. S. Meyers and L. E. Murr, Plenum Press, New York (1981), pp. 675–702.

Overlays are applied to the surface of the target workpiece being laser shock processed. These overlay materials may be of two types, one transparent to the laser radiation, and the other opaque to the laser radiation. They may be used either alone or in combination with each other, but it is preferable that they be used in combination with the opaque overlay adjacent the workpiece and the outer transparent layer being adjacent the opaque layer.

Figure 1:
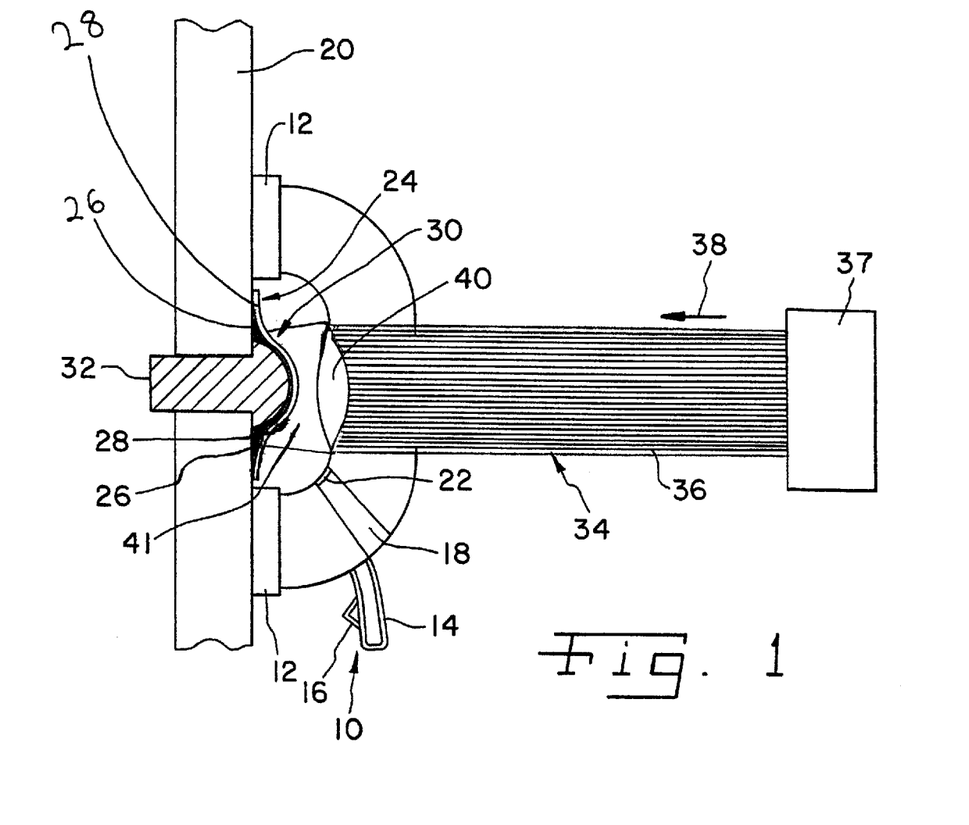
FIG. 1 is a cross sectional view of a remote output end for laser processing around a rivet hole.

Referring to FIG. 1, there is shown remote output end 10. Remote output end 10 consists of shield or skirt 12, handle 14 with trigger 16. Window 18 provides visual access to the workpiece being processed 20.

Remote output end 10 is aligned or positioned to workpiece 20 at a desired location. Window 18 allows an operator to accurately aim and align the remote output end 10. Window 18 may include a bore-sight, cross hairs or other means for accurately locating processing area 30, the area to be laser shock processed. Other means for accurately locating processing area 30 include the use of a light beam (alignment beam) shined on a workpiece, depicting where a pulse of coherent energy will be sent.

During the operation of the present invention, a means such as shutter or cover 22 may slide over the opening of window 18. Shutter 22 prevents scattered energy from the beam or pulse from being emitted through window 18.

In addition to window 18, remote output end 10 may include a camera (not shown). The camera allows an operator to direct the positioning of remote output end 10 along workpiece 20 by viewing the workpiece on a monitor (not shown) rather than directly through window 18. Alignment or positioning could be done manually or remotely such as by the aid of a robot arm (not shown). Lighting for the camera may be required. If remote output end 10 is attached to the end of a robot arm (not shown), an operator may direct remote output end 10 to workpiece 20 by viewing the specific area to be laser shock processed on a monitor screen in communication with the camera.

Skirt 12 is composed of an opaque, flexible, or compressible material which conforms to the varying contours of workpiece 20. Skirt 12 may be composed of durable foam or rubber. When an operator presses remote output end 10 to workpiece 20, skirt 12 makes a seal with workpiece 20. During the operation of the laser, skirt 12 prevents scattered emission of the laser beam and contains any material or debris within remote output end 10 which may have been dislodged from workpiece 20 during the laser's operation.

Overlay system 24 is applied over the area on workpiece 20 to be laser shock processed. Overlay system 24 comprises two layers, an opaque layer 26 and a transparent layer 28. Opaque layer 26 absorbs the pulse of coherent energy which is delivered to its surface. Transparent layer 28 does not absorb the energy from the laser and allows the pulse of coherent energy to pass through transparent layer 28. When overlay system 24 is subject to a pulse of coherent energy from a laser, the beam passes through transparent layer 28 and is absorbed by opaque layer 26. As a result of opaque layer 26 absorbing the beam of coherent energy, a portion of opaque layer 26 is quickly vaporized and turned into plasma at the location where it was struck by the beam of coherent energy. Transparent layer 28 traps the rapidly expanding vaporized opaque layer 26 and directs the corresponding energy into workpiece 20. Consequently, a shock wave is transmitted into workpiece 20.

The pulse of coherent energy is sent from the laser and delivered to remote output end 10 by laser beam delivery means 34. The embodiment in FIG. 1 depicts laser delivery means 34 as a fiber optic bundle 36 connected to a laser 37. Fiber optic bundle 36 comprises a bundle of fibers. The individual fibers are grouped together to form a fiber optic bundle 36. Other laser delivery means may also be utilized in transferring a pulse of coherent energy from laser 37 to remote output end 10 which include a light pipe, and an articulated arm with pivotable mirrors (described below and depicted in FIG. 4).

Trigger 16, when depressed, activates laser 37 to send a beam of coherent energy through laser beam delivery means 34 for processing workpiece 20. During triggering, a beam of coherent energy proceeds in the direction of the arrow 38 through fiber optic bundle 36. The beam of coherent energy traveling through fiber optic bundle 36 is transferred to location 30 by lens 40. Lens 40 transfers the pulse of coherent energy to create the desired spot size at the processing area 30.

As depicted in FIG. 1, a compressive residual stress may be introduced at location 30 on workpiece 20 around rivet 32. Fatigue or corrosion zones tend to form around rivet holes. Therefore, it is advantageous to introduce compressive residual stresses around a rivet hole to reduce fatigue and increase corrosion resistance.

Figure 2:
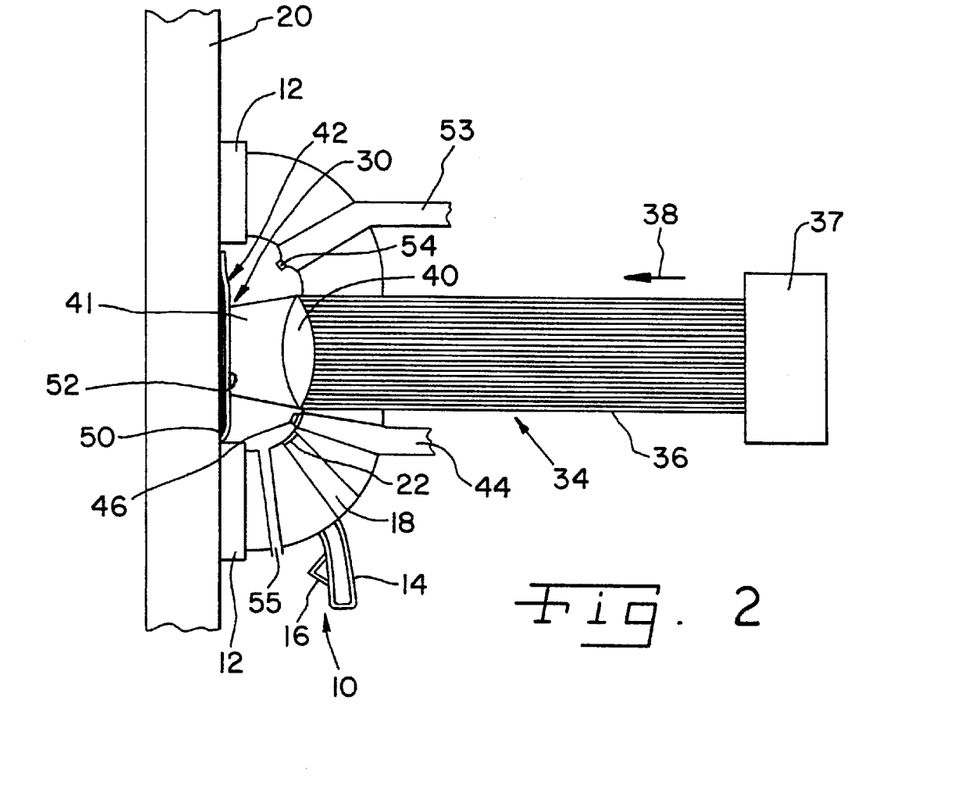
FIG. 2 is a cross sectional view of a remote output end of the present invention including overlay system.

Referring now to FIG. 2, there is shown remote output end 10 with overlay system 42 to supply the opaque and transparent layers 50,52 for laser shock processing. Opaque overlay 50 is composed of energy absorbing paint. Transparent overlay 52 is composed of water.

Overlay system 42 includes opaque layer applicator 44 with paint spray nozzle 46. Opaque layer 50 is composed of paint which is applied through opaque layer applicator 44 to the area to be processed 30 on workpiece 20.

Transparent layer applicator 53 contains water nozzle 54 and applies transparent overlay 52 to the area to be processed 30. Water is removed from remote output end 10 through outlet 55.

During the operation of the present invention, an operator depresses trigger 16 which sends a pulse of coherent energy through laser beam delivery means 34. The pulse of coherent energy is transferred to the area to be processed 30 by lens 40. Transferred beam 41 is directed at opaque layer 50 which has been applied to workpiece 20. Water is applied to the area to be processed 30 by transparent layer applicator 53. Opaque layer 50 absorbs the energy from the pulse whereby vaporizing the area of opaque layer subject to the pulse of coherent energy. Transparent layer 52 contains the expanding plasma resulting from the vaporization of opaque layer 50 and directs the energy to processing spot 30 whereby creating a shock wave within workpiece 20. Opaque layer applicator 44 may be used to apply fresh paint to the area to be processed 30 in subsequent laser shock processing cycles.

Figure 3:
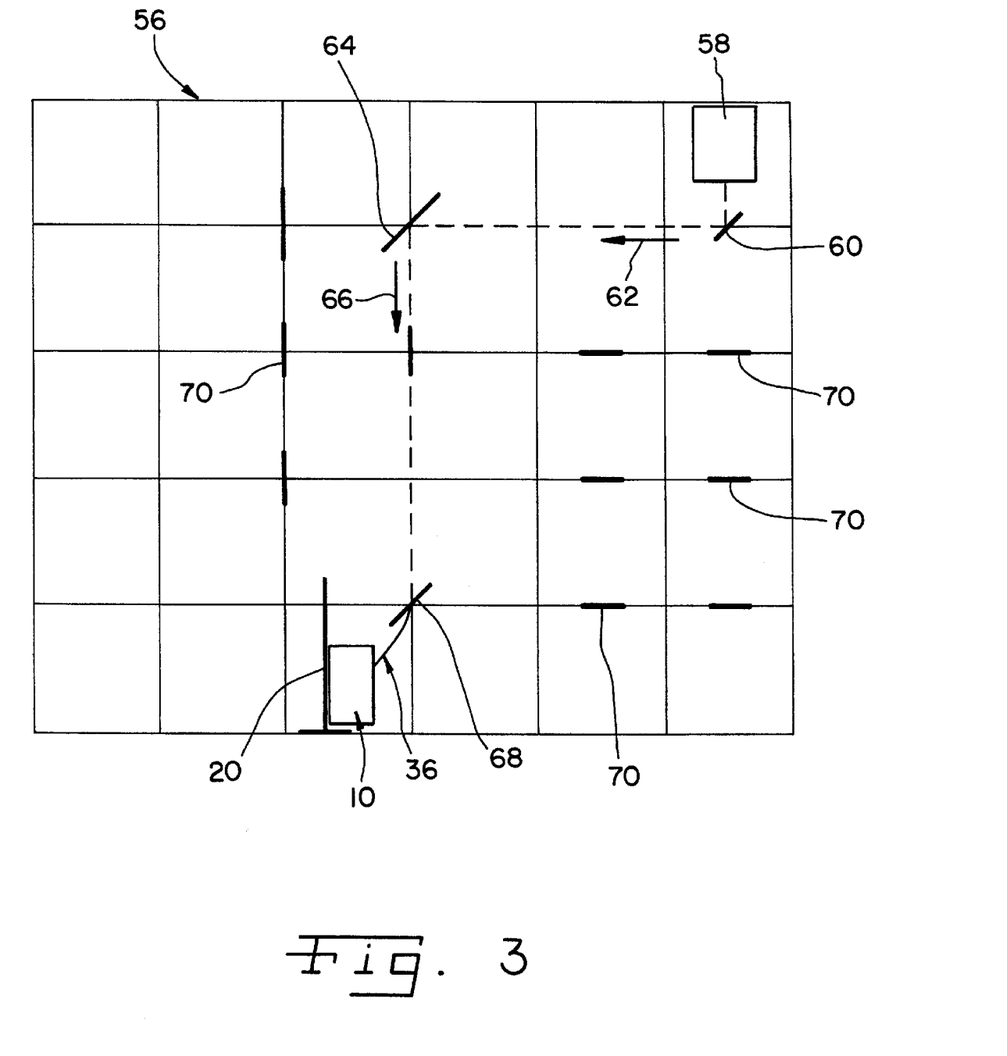
FIG. 3 is a top view of a laser beam delivery service integrated within a building.

FIG. 3 depicts a laser beam delivery service 56 of the present invention. Laser beam delivery service 56 may be retrofitted into an existing building layout or may be incorporated into a new building design. In addition, laser delivery service 56 may be incorporated into other structures such as overhead scaffolding structure or other structures capable of containing laser delivery service 56. Laser 58, which may be located on the floor of the building generates the pulse of coherent energy. The beam of coherent energy is directed from laser 58 up to the ceiling of the room incorporating laser beam delivery service 56. The building ceiling contains a plurality of mirrors 60, 64, 68 to direct a beam of coherent energy anywhere throughout a building layout (as depicted in FIG. 3). Mirror 60 directs the beam toward the direction of arrow 62. Mirror 64 redirects the beam in direction 66. The beam travels along until it reaches mirror 68. Mirror 68 directs the beam of coherent energy down from the ceiling and into fiber optic bundle 36. The pulse of coherent energy travels through fiber optic bundle 36 and is directed through remote output end 10 to workpiece 20 for generating a shock wave therein. Trigger 16 of remote output end 10 is in communication with laser 58 for initiating a pulse of coherent energy through laser beam delivery service 56 for processing workpiece 20.

The beam pathway through laser beam delivery service 56 may be modified. Laser beam delivery service 56 contains a plurality of moveable mirrors, for example 60, 64, 66, 70. Mirrors 60, 64, 68, and 70 are maneuverable such that they may be used to direct or redirect the beam of coherent energy to any location within the grid work of laser beam delivery service 56. For instance, pivoting or relocating mirror 60 permits the beam of coherent energy to travel straight past mirror 60 to a mirror 70. Alternatively, mirrors 60, 54, 66, 70 may be removed completely from the laser beam pathway.

While FIG. 3. depicts the layout of laser beam delivery service 56 as being a Cartesian coordinate grid network, the present invention is not limited to such a grid. Moreover, it is preferable to limit the number of mirrors to decrease laser system losses.

Once a beam of coherent energy is directed down to the floor of the layout, fiber optic bundle 36, in conjunction with remote output end 10, permit unlimited directioning of the pulse of coherent energy to any area of the building.

Figure 4:
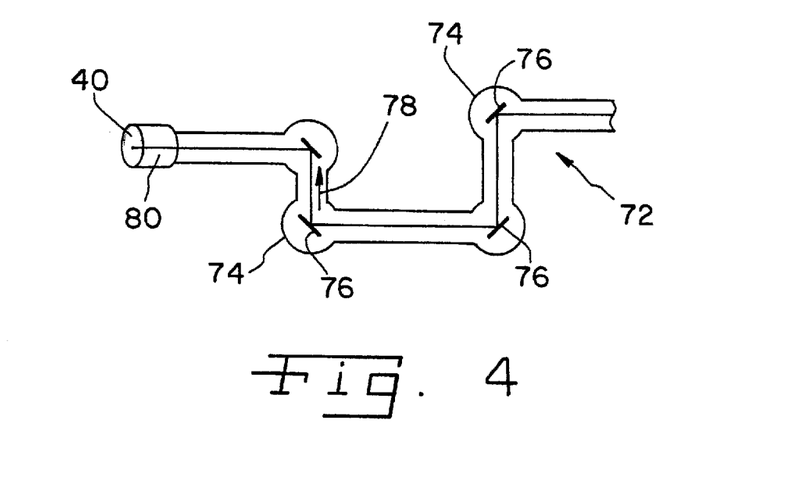
FIG. 4 is a cross sectional view of an articulated arm.

Referring now to FIG. 4, laser beam delivery means 34 may include articulated arm 72. Articulated arm 72 consists of swivels or gimbals 74 which allow articulated arm 72 to move about in three dimensions. Contained within articulated arm 72 are a plurality of mirrors 76, which are pivotably mounted and direct a beam of coherent energy properly through articulated arm 72 in direction 78. A beam of coherent energy is directed through articulated arm 72 and passes through light pipe 80 before being focused by lens 40. Light pipe 80 may be composed of solid glass, plastic, or other materials suitable for carrying a pulse of coherent energy.

Figure 5:
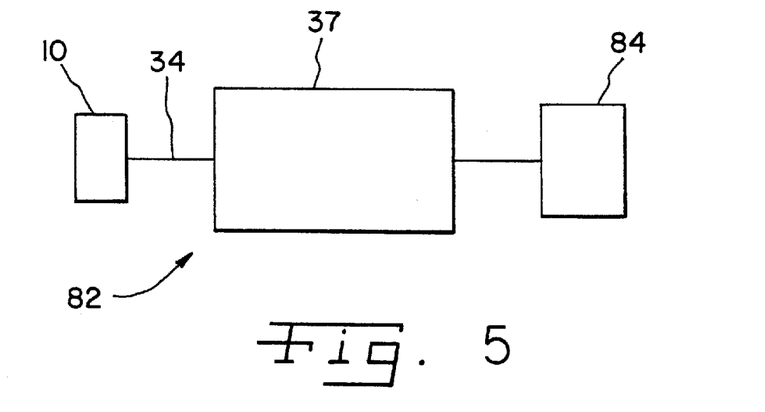
FIG. 5 is a diagrammatic view of a mobile laser shock processing unit.

Referring now to FIG. 5, the present invention, in one embodiment, is a completely mobile unit 82. Mobile unit contains remote output end 10, laser beam delivery means 34, a laser 37, and power unit 84 for providing power to the laser. Mobile unit 82 is compact enough to be easily transported around a manufacturer's factory, as well as from building to building. A high repetition rate laser is not required for operation of the present invention. Since remote output end 10 needs to be relocated between each laser peening cycle, the repetition rate of the laser does not need to exceed the time it takes for relocation. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Figure 7:
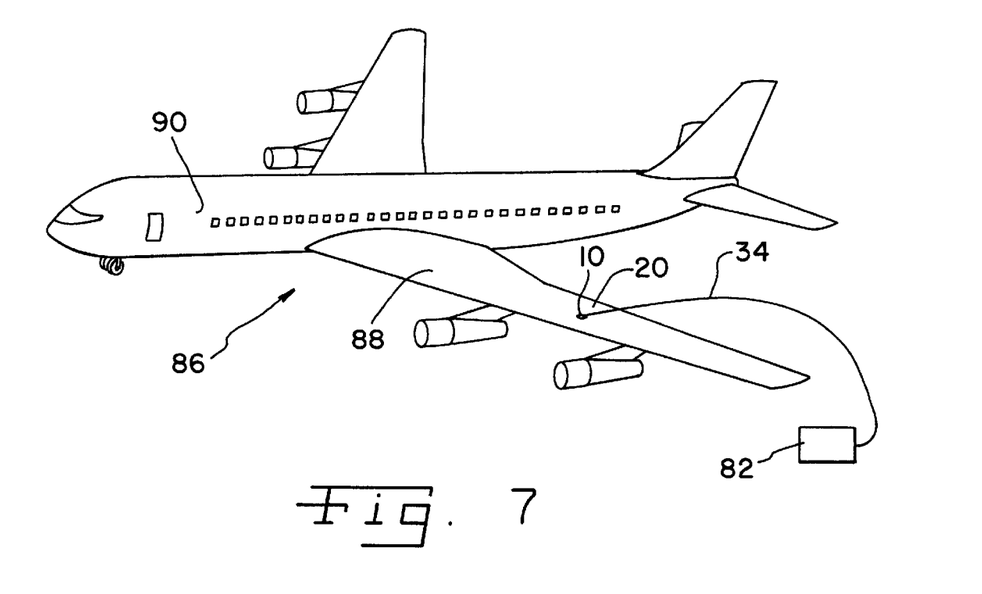
FIG. 7 is a prospective view of an aircraft workpiece to be laser shock processed.

Referring to FIG. 7, one area where remote output end 10 of the present invention may be utilized is in laser shock processing of large parts or workpieces which would not fit into a customary stationary processing station. The present invention, via remote output end 10, allows these fatigue or corrosion sensitive zones to be processed without having to dissemble the workpiece, such as components of an airplane 86 such as wing 88 or fuselage 90, in order to fit the workpiece within a stationary laser shock processing station of finite size and space. Remote output end 10 may be aligned anywhere to a workpiece, e.g., rivit holes or weld, to be processed. Remote output end 10 may be used to introduced compressive residual stresses within a fully assembled large wing section 88 or fuselage 90. Mobile Unit 82 can be located in proximity of airplane 86. A beam of coherent energy may be directed through laser beam delivery means 34 to remote output end 10.

Figure 6:
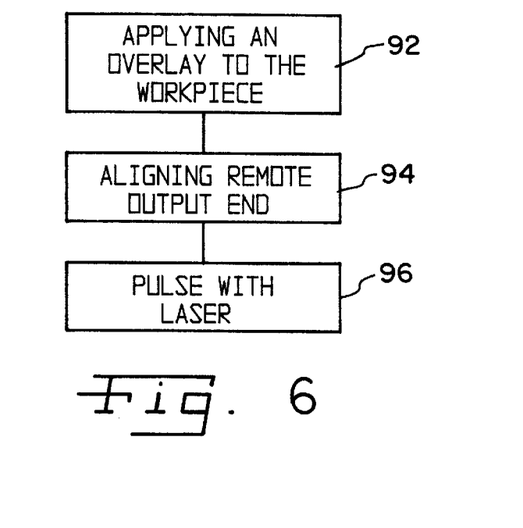
FIG. 6 is a flow chart depicting one method of the present invention.

Referring to FIG. 6, during the operation of the invention, an overlay consisting of an opaque and a transparent layer may be applied to a workpiece to be laser shock processed (92) and a remote output end is located on a workpiece (94). Either step, applying an overlay (92) or locating a remote output end on a workpiece (94), may be done first.

The step of applying an overlay (92) may consist of applying a plastic tape or film containing the opaque and transparent overlay to the workpiece at the area to be laser shock processed. Alternatively, the overlay system could include applying an energy absorbing paint overlay and an energy transparent water overlay.

The remote output end may be aligned to the workpiece by visually aligning the remote output end to the workpiece at the area to be laser shock processed (94). The remote output end contains either a window or a camera for an operator to gain visual access to the processing area. With the aid of cross-hairs, a shined light beam, or other means, the operator is able to accurately align the remote output end at a specific or desired area to be processed (94).

After the overlay has been applied (92) and the remote output end has been aligned to the workpiece (94), a pulse of coherent energy is directed to the workpiece at the processing area (96). The pulse of coherent energy is sent from a laser, through a laser beam delivery means to the remote output end (96). In the particular embodiment where the laser beam delivery means contains a laser beam delivery system, the pulse of coherent energy is sent from the laser, up to the ceiling, across the ceiling, back down, again, and to the remote output end (96). The energy from the pulse of coherent energy, then passes through the transparent overlay layer and is absorbed by the opaque overlay layer.

What is claimed is:

1. An apparatus for improving the properties of a workpiece by providing shock waves by remote processing therein, comprising:
    means having a remote output end and a handle, said means alienable by hand;
    a laser peening system operatively associated with said remote output end;
    means for aligning said remote output end; and
    laser beam delivery means for delivering a beam of coherent energy to said remote output end.

2. An apparatus according to claim 1 further comprising:
    a power unit and said apparatus is mobile.

3. An apparatus according to claim 2 further comprising an overlap system.

4. An apparatus according to claim 3 wherein said overlay system is within said remote output end.

5. An apparatus according to claim 1 further comprising an overlay system.

6. An apparatus according to claim 5 wherein said overlay system comprises:
    an opaque layer applicator; and
    a transparent layer applicator.

7. An apparatus according to claim 6 wherein said overlay system is operationally associated with sa remote output end.

8. An apparatus according to claim 6 wherein said overlay system is attached to said remote output end.

9. An apparatus according to claim 1 wherein said laser beam delivery means comprises fiber optics.

10. An apparatus according to claim 9 wherein said laser beam delivery means comprises a laser beam delivery service integrated within one of a building and structure.

11. An apparatus according to claim 1 wherein said laser beam delivery means comprises a light pipe.

12. An apparatus according to claim 11 wherein said laser beam delivery means further comprises a laser beam delivery service integrated within one of a buildings and a structure.

13. An apparatus according to claim 1 wherein said laser beam delivery means comprises moveable mirrors.

14. An apparatus according to clamp 13 wherein said moveable mirrors re contained within an articulated arm.

15. An apparatus according to claim 13 wherein said laser beam delivery means further comprises a laser beam delivery service integrated within one of a building and a structure.

16. An apparatus according to claim 1 wherein said laser beam delivery means comprises a laser beam-delivery service integrated within one of a building and a structure.

17. An apparatus according to claim 16 wherein said laser beam delivery service is integrated into a ceiling of said building.

18. A method of improving the properties of a workpiece by providing shock waves, comprising the steps:
    applying an overlay to a portion on the workpiece;
    aligning a remote laser output end means to the overlay portion of the workpiece by hand; and
    directing a pulse of coherent energy to the overlay portion of the workpiece in an eye safe manner.

19. The method according to claim 18 wherein said step of directing a pulse of coherent energy to the overlay portion of the workpiece comprises the step of directing the pulse of coherent energy through a fiber optic bundle.

20. The method according to claim 19 wherein said step of directing a pulse of coherent energy to the overlay portion of the workpiece comprises:
    directing the pulse of coherent energy through a laser beam delivery service integrated within a building.

21. The method according to claim 18 wherein said step of directing a pulse of coherent energy to the overlay portion of the workpiece comprises the step of directing the pulse of coherent energy through a light pipe.

22. The method according to claim 21 wherein said step of directing a pulse of coherent energy to the overlay portion of the workpiece comprises:
    directing the pulse of coherent energy through a laser beam delivery service integrated within a building.

23. The method according to claim 18 wherein said step of directing a pulse of coherent energy to the overlay portion of the workpiece comprises the step of directing the pulse of coherent energy through an articulated arm comprising a plurality of moveable mirrors.

24. The method according to claim 23 wherein said step of directing a pulse of coherent energy to the overlay portion of the workpiece comprises:

directing the pulse of coherent energy through a laser beam delivery service integrated within a building.

25. The method according to claim 18 herein said step of applying an overlay on the workpiece, further comprises the step:

applying an opaque and a transparent overlay.

26. The method according to claim 18 wherein said step of directing a pulse of coherent energy to the overlay portion of the workpiece comprises:

directing the pulse of coherent energy through a laser beam delivery service integrated within a building.

27. An apparatus for improving the properties of a workpiece by providing shock waves by remote processing therein, comprising:

means having a remote output end and a handle, said means alignable by hand;

a laser peening system operatively associated with said remote output end;

a transparent overlay applicator attached to said remote output end means;

means for aligning said remote output end; and laser beam delivery means for delivering a beam of coherent energy to said remote output end.

\* \* \* \* \*

UNITED STATES PATENT AND TRADEMARK OFFICE
CERTIFICATE OF CORRECTION

PATENT NO.   : 6,288,358 B1
DATED        : September 11, 2001
INVENTOR(S)  : Jeffrey L. Dulaney, Steven M. Toller and Allan H. Clauer It is certified that error appears in the above-identified patent and that said Letters Patent is hereby corrected as shown below:

Column 1,
Line 17, "Currently" should read -- Current --.

Column 4,
Line 2, "has" should read -- as --.

Column 6,
Line 18, "66" should read -- 68 --;
Line 24, "54, 66" should read -- 64, 68 --.

Column 7,
Line 55, "alienable" should read -- alignable --;
Line 64, "overlap" should read -- overlay --.

Column 8,
Line 8, "sa" should read -- said --;
Line 26, "re" should read -- are --.

Signed and Sealed this

Twenty-first Day of May, 2002

Attest:

Attesting Officer

JAMES E. ROGAN
*Director of the United States Patent and Trademark Office*